Dec. 22, 1970   R. J. BRONIKOWSKI   3,550,056
ENCLOSED FUSE
Filed Jan. 31, 1969
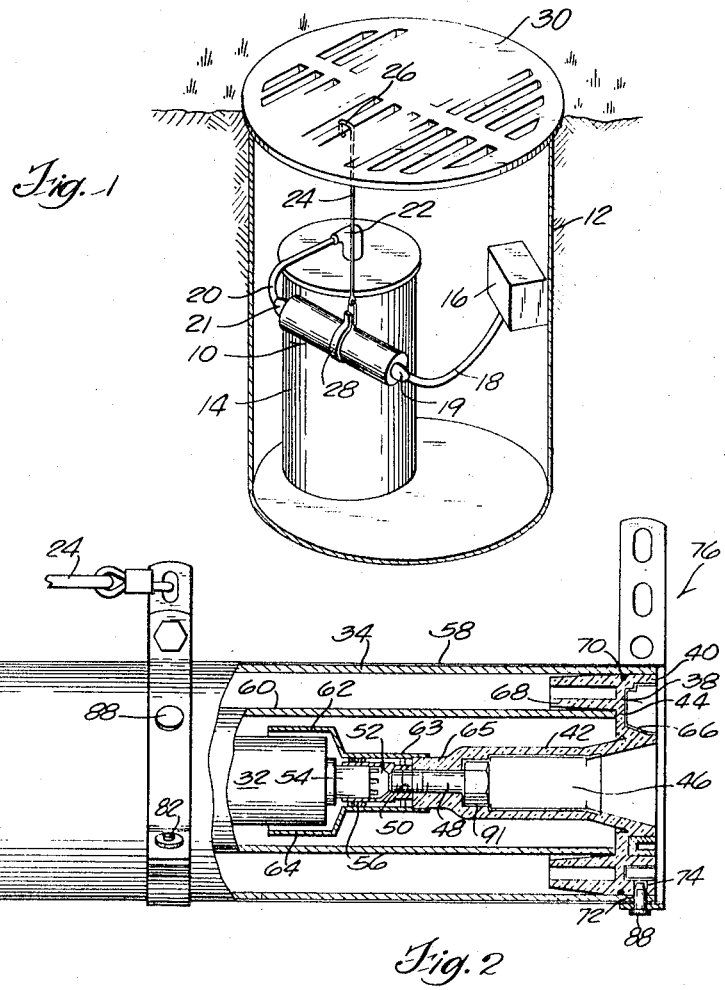
Fig. 1
Fig. 2
Fig. 3
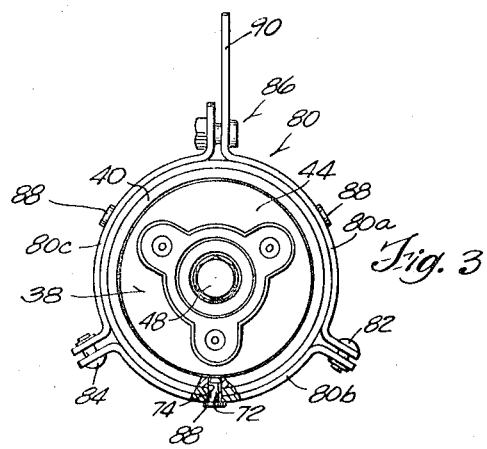
Inventor
Raymond J. Bronikowski
By Joseph A. Denigan
Attorney United States Patent Office 3,550,056
Patented Dec. 22, 1970

3,550,056
ENCLOSED FUSE
Raymond J. Bronikowski, South Milwaukee, Wis., assignor to McGraw-Edison Company, South Milwaukee, Wis., a corporation of Delaware
Filed Jan. 31, 1969, Ser. No. 795,619
Int. Cl. H01h 85/02, 85/56
U.S. Cl. 337—199
11 Claims

ABSTRACT OF THE DISCLOSURE

A fuse for a submersed electrical installation is housed in a sealed enclosure. The electrical field surrounding the fuse is controlled by a conductive layer on the outside of the enclosure. The conductive layer surrounds the fuse and is at ground potential with respect to the fuse which is at line potential. End bushings for closing the ends of the enclosure are held in position by a releasable clamp and are removable to afford ready access for fuse replacement. For additional field control the axially outward facing surfaces of the end bushings also carry a conductive layer at ground potential.

BACKGROUND OF INVENTION

This invention relates to shielding a fuse and, more particularly, to controlling the electrical field surrounding the fuse in a manner which is particularly well suited for use in submersible installations, or like installations where conditions ambient the fuse may vary.

An enclosed fuse, which is at line potential, may experience an unbalance in the field surrounding the fuse, and its associated electrically live elements, as a result of changes in the environment surrounding the fuse and its enclosure. The unbalanced field can give rise to corona discharge with eventual damage of the installation. For example, in an underground, or otherwise submersed installation, the fuse assembly may be suspended in a vault. Partial flooding of the vault may place a portion of the fuse enclosure under water. The portion of the fuse enclosure under water is at ground potential while the remainder of the enclosure may be electrically neutral, thereby unbalancing the field. This invention is concerned with the problem of controlling this field to maintain a uniform field and prevent corona.

SUMMARY OF INVENTION

An object of this invention is to provide an enclosed fuse assembly having a controlled field surrounding the fuse and its associated electrically live elements.

A further object is to provide a fuse enclosure which securely seals the enclosure interior while facilitating fuse replacement.

For the achievement of these and other objects, this invention proposes an enclosure for a fuse which carries a conductive layer on its outside surface in surrounding relationship with the fuse and connected electrically with respect to said fuse, preferably at ground potential. To facilitate assembly and fuse replacement, the enclosure has removable end bushings closing the enclosure ends. A releasable electrical connection is made to the fuse through the end bushings and a releasable clamp selectively locks the end bushings in the enclosure. For additional field control the axially outward facing surfaces of the end bushings carry a conductive layer, preferably at the same potential as the conductive layer surrounding the fuse.

DESCRIPTION OF DRAWINGS

FIG. 1 is a generally schematic view of an underground installation incorporating the fuse assembly of this invention;

FIG. 2 illustrates the enclosed fuse assembly partially in section to expose the interior structure; and FIG. 3 is an end view of the fuse assembly.

DESCRIPTION OF PREFERRED EMBODIMENT

FIG. 1 illustrates enclosed fuse assembly 10 in an underground installation. The installation includes a buried vault 12 enclosing electrical apparatus, as illustrated a distribution transformer 14. An underground distribution cable (not shown) enters the vault through junction box 16. Cable 18 connects the fuse assembly to the junction box and cable 20 establishes the electrical connection between the fuse assembly and distribution transformer 14 through a conventional terminal assembly 22. Cables 18 and 20 are connected to the fuse assembly by cable connectors 19 and 21 of conventional construction, e.g. that shown in Pat. 3,401,370 to Weinfurth et al. for a "Separable Connector for Underground System" and assigned to the assignee of this application. The fuse assembly is suspended from tether hook 26 by line 24 extending from the tether hook to clamp 28 on the fuse enclosure, this arrangement will be described in more detail hereinafter. Access to the vault is provided through manhole cover 30.

Attention is now directed to FIGS. 2 and 3 for a more complete description of the structure of the enclosed fuse assembly. Fuse member 32 can be of conventional construction, for example that disclosed and claimed in Pat. No. 3,437,971 issued to Harvey W. Mikulecky and assigned to the assignee of this application. The fuse member is housed in an enclosure formed by a cylindrical body 34 and end bushings 36 and 38 enclosing the otherwise open axial ends of the cylindrical body. The cylindrical body is made of filament wound glass fibers bonded with an epoxy resin (fiber glass) or other suitable impervious electrical insulating material with good dielectric strength. The end bushings are also cast from a suitable electrical insulating material and are preferably void free, exhibit a high dielectric strength and resistance to electrical tracking, the material can be, for example, a glass filled polyester compound or a suitably filled epoxy resin. An example of a polyester compound which has given good results in apparatus of this type is that sold by the Rostone Corporation and identified as their No. 3250.

The construction of both end bushings and their connection to the fuse member 32 through the end bushing are identical and, accordingly, only one end bushing and its connection to the fuse member will be described. End bushing 38 includes an outer, generally cylindrical wall 40 and a central axially extending hollow hub 42. Wall 40 and hub 42 are connected by web 44, wall 40, hub 42 and the web defining an annular outwardly opening space. Cable connector 19 (not shown in FIGS. 2 and 3) is received in bore 46 of hub 42. Connector-adapter bolt 48 is part of hub 42 and has an axially extending stud portion 50. Receptacle 52 is threaded onto the end of stud 50 and is made up of a plurality of circumferentially spaced axially extending fingers at its free end. Fuse member 32 includes end terminals 54 at the opposite ends thereof, these terminals are engaged in receptacle 52. A contact pressure spring 56 surrounds the fingers of the receptacle to insure current transfer in the receptacle. In assembly, one of the end bushings can be inserted in the cylindrical housing, for example end bushing 36. Fuse member 32 is then positioned within the enclosure with its left terminal (as viewed in the drawings) engaged in the receptacle connected to bushings 36. Bushing 38 is inserted in the opposite end of the cylindrical enclosure to engage fuse terminal 54 in receptacle 52. The cables 18 and 20 are suitably connected to cable connectors 19 and 21 to complete the electrical connection of the fuse member. At bushing 38 electrical connection is made through terminal 54, receptacle 52, stud 50 and the remaining conductor arrangement (not shown) in the cable connector. The construction of the cable connectors has not been shown for convenience and for the reason that the details of construction are not necessary to a thorough understanding of this invention.

Fuse member 32 and its associated electrically live elements, such as fuse terminal 54, receptacle 52, stud 50, etc. are at line potential and therefore will be surrounded by an electrical field. The nature of that field will be determined by the environment around the fuse and around the enclosure housing the fuse. For example, should vault 12 become partially flooded with water so that a portion of the enclosure is under water, that portion would be at ground potential whereas the remainder of the fuse enclosure would be electrically neutral. This would tend to unbalance the electrical field around the fuse member and concentrate the field in relation to the grounded portion of the enclosure. Such an uncontrolled and unbalanced field can give rise to corona and result in the destructive effects usually attendant corona.

This invention is corncerned with controlling the field around the fuse member or, more particularly, controlling the field within the enclosure. To this end, a conductive layer 58 is coated on the outer surface of cylindrical member 34 and covers the entire outside surface of the enclosure to completely surround the fuse member and its associated electrically live elements. The conductive coating is then connected electrically with respect to the fuse member or the distribution line. When so connected, the field within the enclosure, or between the fuse member and the conductive layer, is controlled and will remain uniform regardless of changes in the environment around the enclosure. Preferably, the conductive layer is connected at ground potential which, in addition to controlling the field within the enclosure, is desirable from a safety standpoint. Connection of the conductive layer to ground is made in a conventional manner. A conductive epoxy resin, more particularly an epoxy resin impregnated with a suitable conductive medium, has given satisfactory results as the material for the conductive layer.

With the provision of the conductive layer, desired BIL (basic impulse insulation level) values have been achieved, for example for 15 kv. systems a 95 kv. BIL is obtained. In some applications a barrier tube 60, which can be of the same material as cylindrical member 34, is provided within the enclosure and extends axially between end bushings 36 and 38 and is physically between fuse member 32 and cylindrical member 34.

Also, fuse guides 62 can be assembled onto both of the end bushings. These guides are made of the same material as the end bushing but can also be made of an epoxy resin. Guides 62 are generally funnel-shaped and have an axially inward facing open end 64 for receipt of fuse member 32. The smaller diameter end 63 of the guide is engaged on end 65 of hub 42. These guides serve a dual function in that they guide the fuse member into engagement with receptacles 52 and also provide an additional dielectric barrier around the electrically live fuse terminal and its associated terminal connections.

In order to provide still further control of the electrical field associated with the fuse member, in some applications the axially outward facing surface of web 44 is also provided with a layer of conductive coating 66. This layer extends completely around web 44 and is provided at both axial ends of the enclosure. The layer is of the same material as layer 58.

Also, each of the end bushings is provided with an inner generally cylindrical rib 68 and the outer cylindrical wall 40 of the end bushing extends substantially beyond web 44. The rib and the extension of wall 40 increase the creepage distance between the electrically live elements and the ground plane. It will also be noted that rib 68 serves to locate barrier tube 60 with respect to the end bushings.

The ground connection for the conductive layer 66 can be made in any suitable manner such as that for layer 58.

Annular sealing rings 70 fit into an annular groove in the outer wall of each of the end bushings 36 and 38 and engage the inner wall of cylindrical member 34 to provide a watertight seal.

As stated above, end bushings 36 and 38 can be readily withdrawn from the cylindrical members. To prevent accidental dislodgment of the end bushings from the cylindrical member, an improved clamping arrangement, which is illustrated in FIGS. 2 and 3, has been provided. More particularly, cylindrical member 34 is provided with three equiangularly spaced openings 72 adjacent both of its open ends. Bushings 36 and 38 are also provided with three similar openings 74 which are registered with openings 72 when the end bushings are inserted in the cylindrical housing. Identical clamp assemblies 76 and 78 are provided at both ends of the enclosure. With reference to clamp assembly 76, it includes a circular band 80 made up of three separate arcuate sections 80a, 80b and 80c. The arcuate segments are provided with radial ears at their ends. Adjacent ears of segment 80a and 80b are connected by rivet 82 and adjacent ears of 80b and 80c are connected by rivet 84. The adjacent ears of segment 80a and 80c are connected by a nut and bolt assembly 86 for selective release of the clamp. Each of the arcuate segments carries a pin 88, the pins fit into the registering openings in the enclosure and the end bushings. With the pins positioned in the registering openings, the nut and bolt assembly 86 is tightened to securely clamp the arcuate segments around the periphery of the cylindrical member and thereby clamp the end bushing 38 in the enclosure. Bushing 36 is similarly clamped in its position. To remove end bushing 38, the nut and bolt assembly 86 is released relieving the clamping pressure on the circular band 80 and allowing pins 88 to be withdrawn from the registering openings. The bushing 38 can then be withdrawn through the end of the cylindrical member.

As mentioned above, tether hook 26 is adapted to engage the vault wall and is connected by cord 24 to a clamp 28 surrounding the enclosure at its midpoint. Cord 24 can be of nylon or any other suitable cord material. Generally, the tether hook, nylon cord and mid-clamp 28 provide the sole support for the enclosed fuse assembly within the vault. It will be noted, however, that ear 90 of arcuate segment 80a of the end clamps is considerably longer than the other ears and this elongated ear affords a further method of attachment of the enclosed fuse assembly in an installation and can provide the ground connection for layer 58.

The inner surface of bore 46 in the area of connector-adapter bolt 48 may also be provided with a layer 91 of conductive material. The material can be the same as that used in layers 58 and 60. The connector-adapter bolt is at line potential and the sharp corners can result in high stress concentration areas and give rise to corona. Layer 91 is electrically connected to the connector-adapter bolt so that a smooth, uniform electrical field is presented in that area and stress concentrations are avoided.

With the construction of this enclosed fuse assembly it will be noted that a watertight enclosure has been provided, but that the fuse member is readily replaceable merely by removing an end bushing, withdrawing the old fuse, inserting the new fuse, and re-assembling the end bushing. All of the connections are sliding connections and can be made and released with a simple axial motion. This greatly facilitates not only initial assembly but in-field replacement.

What is claimed is:

1. In a submersed electrical installation the combination of:
an enclosure,
electrical apparatus within said enclosure,
an electrical supply line entering said enclosure for electrical connection to said electrical apparatus,
a fuse assembly disposed within said enclosure,
means connecting said supply line to said electrical apparatus through said fuse assembly,
and said fuse assembly comprising:
a fuse member,
a generally cylindrical enclosure having opposite open ends and surrounding said fuse member,
end bushings, one closing each of the open ends of said cylindrical enclosure and each including electrical connecting means engaging said fuse member and through which the electrical connection of said fuse member to said line and electrical apparatus is made,
means connecting said end bushings in said cylindrical member,
a conductive layer on the outside of said cylindrical enclosure with respect to said fuse member and surrounding said fuse member,
and means electrically connecting said conductive layer at ground potential so that the electrical field surrounding said fuse member is controlled.

2. The combination of claim 1 including:
means defining a conductive layer on the axially outer facing surfaces of said end bushings,
and means connecting said conductive layer on said end bushings electrically at ground potential.

3. The combination of claim 1 including a hollow barrier member of electrical insulating material within said cylindrical enclosure and surrounding said fuse member.

4. The combination of claim 1 including means providing a sealed engagement between said end bushings and said cylindrical member.

5. The combination of claim 1 including:
means defining a plurality of openings in said cylindrical enclosure adjacent one end thereof,
means defining openings in the end bushing closing said one cylindrical enclosure end, said end bushing openings registering with said cylindrical enclosure openings,
and clamp means for securing said end bushing in said one cylindrical enclosure end, said clamp means including a band portion encircling said cylindrical enclosure, a plurality of pins carried on said band and extending into said registering openings, and means for fastening said band on said cylindrical enclosure with said pins in said registering openings to lock said end bushing in said cylindrical enclosure and for releasing said band to remove said pins from said openings to release said end bushing for removal from said cylindrical enclosure.

6. The combination of claim 5 wherein said means connecting said fuse member to said electrical apparatus and said supply line has an axial sliding engagement with said fuse member so that said fuse member is releasably connected to said electrical connecting means.

7. A fuse assembly comprising, in combination,
a hollow, generally cylindrical enclosure of electrical insulating material and having opposite open ends,
a generally elongated fuse member supported within said enclosure and extending longitudinally therein,
an end bushing engaged in each of the open ends of said cylindrical enclosure, said end bushings including means engaging said fuse member and through which electrical connection is made to said fuse member,
a conductive layer on the outside of said cylindrical enclosure with respect to said fuse member and surrounding said fuse member,
and means electrically connecting said conductive layer at ground potential so that the electrical field surrounding said fuse member is controlled.

8. The fuse assembly of claim 7 including:
a conductive layer on the axially outer facing surfaces of said end bushings,
and means electrically connecting said conductive layer on said end bushings at ground potential.

9. The fuse assembly of claim 7:
wherein said end bushings are made of electrical insulating material,
and including means defining an axially extending hollow fuse guide on each end bushing and opening inwardly, said fuse guides being made of electrical insulating material and telescoping said fuse member.

10. The fuse assembly of claim 7 including:
means defining a plurality of openings in said cylindrical member adjacent one end thereof,
means defining openings in the end bushing closing said one cylindrical member end, said end bushing openings registering with said cylindrical member openings,
and clamp means for securing said end bushing in said one cylindrical member end, said clamp means including a band portion encircling said cylindrical member, a plurality of pins carried on said band and extending into said registering openings, and means for fastening said band on said cylindrical member with said pins in said registering openings to lock said end bushing in said cylindrical member and for releasing said band to remove said pins from said openings to release said end bushing for removal from said cylindrical member.

11. The combination of claim 7 including a hollow barrier member of electrical insulating material within said cylindrical enclosure and surrounding said fuse member.

References Cited

UNITED STATES PATENTS

| | | | |
|---|---|---|---|
| 3,401,245 | 9/1968 | Cameron | 337—199 |
| 3,345,450 | 10/1967 | Spindle | 174—127X |
| 3,309,477 | 3/1967 | Bronikowski | 337—158 |
| 3,244,838 | 4/1966 | Astleford, Jr. | 337—199X |
| 3,066,180 | 11/1962 | Virsberg et al. | 174—140(C) |
| 1,994,282 | 3/1935 | Lusignan, Jr. | 174—140(C) |

BERNARD A. GILHEANY, Primary Examiner

D. M. MORGAN, Assistant Examiner

U.S. Cl. X.R.

174—140; 337—187

PO-1050
(5/69)

UNITED STATES PATENT OFFICE
CERTIFICATE OF CORRECTION

Patent No. 3,550,056　　　　　　　Dated December 22, 1970

Inventor(s) Raymond J. Bronikowski

It is certified that error appears in the above-identified patent and that said Letters Patent are hereby corrected as shown below:

Column 6, Lines 32, 33, 36, 38, 40, 42, 45, change "member" to --enclosure--.

Signed and sealed this 23rd day of March 1971.

(SEAL)
Attest:

EDWARD M. FLETCHER, JR.　　　　　　　WILLIAM E. SCHUYLER, JR.
Attesting Officer　　　　　　　　　　Commissioner of Patents